United States Patent
Chung

(10) Patent No.: US 7,363,575 B2
(45) Date of Patent: Apr. 22, 2008

(54) METHOD AND SYSTEM FOR TERC4 DECODING USING MINIMUM DISTANCE RULE IN HIGH DEFINITION MULTIMEDIA INTERFACE (HDMI) SPECIFICATIONS

(75) Inventor: Jeff H. Chung, Orange, CA (US)

(73) Assignee: Broadcom Corporation, Irvine, CA (US)

( * ) Notice: Subject to any disclaimer, the term of this patent is extended or adjusted under 35 U.S.C. 154(b) by 630 days.

(21) Appl. No.: 10/988,147

(22) Filed: Nov. 12, 2004

(65) Prior Publication Data

US 2006/0104392 A1 May 18, 2006

(51) Int. Cl.
*H03M 10/00* (2006.01)

(52) U.S. Cl. ..................................... 714/759; 714/777

(58) Field of Classification Search .................. 714/759
See application file for complete search history.

(56) References Cited

U.S. PATENT DOCUMENTS

| 6,914,637 | B1* | 7/2005 | Wolf et al. ................. 348/473 |
| 2004/0158873 | A1* | 8/2004 | Pasqualino .................. 725/131 |

\* cited by examiner

*Primary Examiner*—Guy J. Lamarre
(74) *Attorney, Agent, or Firm*—McAndrews, Held & Malloy, Ltd.

(57) ABSTRACT

Certain embodiments of the invention provide a method and system for TERC4 decoding using minimum distance rule. A plurality of bits may be received that may indicate addresses of samples of data. A lookup table may be generated based on the received plurality of bits to determine corresponding output samples of data. The received plurality of bits may be exclusive ORed with the generated corresponding output samples of data. A distance value for each sample of data may be calculated based on an output generated by the exclusive ORing of the received plurality of bits with the generated corresponding output samples of data. An error in each of the received samples of data may be corrected based on the calculated distance value.

36 Claims, 3 Drawing Sheets

METHOD AND SYSTEM FOR TERC4 DECODING USING MINIMUM DISTANCE RULE IN HIGH DEFINITION MULTIMEDIA INTERFACE (HDMI) SPECIFICATIONS

CROSS-REFERENCE TO RELATED APPLICATIONS/INCORPORATION BY REFERENCE

Not Applicable.

FIELD OF THE INVENTION

Certain embodiments of the invention relate to High Definition Multimedia Interface (HDMI). More specifically, certain embodiments of the invention relate to a method and system for transition minimized differential signaling (TMDS) error reduction coding—4 bit (TERC4) decoding using minimum distance rule in High Definition Multimedia Interface (HDMI) specifications.

BACKGROUND OF THE INVENTION

HDMI is a specification that integrates audio and video information into a single digital interface to be used with, for example, digital video disc (DVD) players, digital television (DTV), high definition TV (HDTV), set-top boxes, and other audio and/or video devices. A key element of HDMI is the ability to utilize high bandwidth digital content protection (HDCP). Notwithstanding, the high definition multimedia interface also utilizes core technologies provided by the digital visual interface (DVI). High bandwidth digital content protection provides a method for protecting copyrighted digital content that utilizes the digital visual interface by encrypting data transmitted between a source and a destination device. The source device may include, but is not limited to, a computer, a set-top box, D-VHS, or a DVD player. The receiver destination device may be a television, projector, a LCD display, or a plasma panel, for example.

The digital visual interface is a standardized protocol, which facilitates the coupling of analog and digital monitors using a single connector. The digital visual interface is a 24-bit RGB interface, which utilizes transition minimized differential signaling (TMDS), the latter of which has become quite popular. A DVI link utilizes three (3) pairs of differential digital signals, each pair carrying low voltage signals representative of the red (R), green (G) and blue (B) signal components. Each of the pairs may also carry synchronization information. Additionally, a fourth pair of wires carries a pixel clock signal. A serial 8-bit RGB signal carries information at a speed of up to 1.65 Gbps with an aggregate link speed of 4.95 Gbps, but an effective transfer rate of 3.96 Gbps. In order to minimize transitions at such high data rates, a 10-bit encoding scheme is utilized.

A DVI connector permits two links to be coupled to the connector. To minimize connector size, the two links share the same clock signal, resulting in a maximum data rate of 9.9 Gbps. DVI also includes a display data channel (DDC), which permits a video source such as a PC to communicate with a DVI capable display. The DDC utilizes a low speed, bi-directional two-wire bus similar to an I²C bus. A digital signal that is transmitted to an analog monitor may be converted into an analog signal using a DVI connector. In instances where a digital monitor is utilized, then no conversion is performed. However, in the case of an analog monitor, then D/A conversion is required. The popularity of DVI along with various standardized changes has resulted in a plethora of products now supporting DVI.

The high definition multimedia interface supports standardized, enhanced, or high-definition video formats along with multi-channel surround sound audio. Some of the benefits of high definition multimedia interface may include, but are not limited to, uncompressed digital video, a bandwidth of up to five gigabytes per second and a single connector instead of multiple connectors and cables. The high definition multimedia interface may also be adapted to facilitate communication between a video source and, for example, a DTV.

Transition minimized differential signaling is a signaling technique that produces a transition controlled, DC balanced series of characters from an input series of data bytes. In a long string of logic zeros and logic ones, bits are selectively manipulated in order to keep the DC voltage level of the overall signal centered around a particular signal threshold. Transition minimized differential signaling may use, for example, bit inversion to maintain a particular DC biased signal. A signal threshold may determine whether a received data bit is at a voltage level equivalent to logic zero (0) or at a voltage level equivalent to logic one (1).

Various silicon-based versions of transition minimized differential signaling encoders and receivers have been developed. One version of the high definition multimedia interface implements a new coding scheme, which is referred to as TERC4. The TERC4 encoding scheme maps sixteen (16) 4-bit characters to 10-bit symbols. The new encoding scheme also includes various symbols, which may be utilized as guard bands. The high definition multimedia interface specification provides an adequate description of how the guard bands may be utilized. One released revision of the bandwidth digital content protection encryption standard includes various algorithms, which may be utilized for encrypting of HDMI data. TERC4 symbols and guard band symbols, which may be collectively known as HDMI symbols, are 10-bits in length and have five (5) logic ones (1s) and five (5) logic zeros (0s), to ensure that they are DC balanced. In this regard, the high definition multimedia interface (HDMI) symbols are valid TMDS codewords and the HDMI codewords are mapped to a unique un-encoded TMDS byte. A one-to-one mapping may be used to map the high definition multimedia interface codewords into the unique un-encoded TMDS byte.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention provide a method and system for transition minimized differential signaling (TMDS) error reduction coding—4 bit (TERC4) decoding using minimum distance rule. A plurality of bits may be received that may indicate addresses of samples of data. A lookup table may be generated based on the received plurality of bits to determine corresponding output samples of data. The received plurality of bits may be exclusive ORed with the generated corresponding output samples of data. A distance value for each sample of data may be calculated based on an output generated by the exclusive ORing of the received plurality of bits with the generated corresponding output samples of data. An error in each of the received samples of data may be corrected based on the calculated distance value.

The method may comprise detecting if the calculated distance value is zero. The received samples of data may be TERC4 decoded if the calculated distance value is zero (0). The distance value for each of the received samples of data may be calculated by counting a number of bits having a value of one (1) in the output generated by the exclusive ORing of the received plurality of bits with the generated corresponding output samples of data. The method may further comprise detecting if the calculated distance value is non-zero. The detected calculated non-zero distance value may have a plurality of bits having a value of one (1). Any bit having a value of one (1) may be chosen in the output generated by the exclusive ORing of the received plurality of bits with the generated corresponding output samples of data. The received samples of data may be TERC4 decoded in response to the choosing of any bit having a value of one (1). A first bit having a value of one (1) may be chosen in the output generated by the exclusive ORing of the received plurality of bits with the generated corresponding output samples of data. The received samples of data may be TERC4 decoded in response to the choosing of the first bit having a value of one (1). The detected calculated non-zero distance value may have a single bit having a value of one (1). The received samples of data may be TERC4 decoded in response to the detected non-zero distance value.

Another embodiment of the invention may provide a machine-readable storage, having stored thereon, a computer program having at least one code section executable by a machine, thereby causing the machine to perform the steps as described in the method and system for TERC4 decoding using minimum distance rule.

In another embodiment of the invention, a system for TERC4 decoding using minimum distance rule may be provided. In this regard, circuitry may be adapted to receive a plurality of bits that may indicate addresses of samples of data. A lookup table may be generated based on the received plurality of bits to determine corresponding output samples of data. Circuitry may be adapted to exclusive OR the received plurality of bits with the generated corresponding output samples of data. Circuitry may be adapted to calculate a distance value for each sample of data based on an output generated by the exclusive ORing of the received plurality of bits with the generated corresponding output samples of data. Circuitry may be adapted to correct an error in each of the received samples of data based on the calculated distance value.

The system may comprise circuitry that may be adapted to detect, if the calculated distance value is zero. Circuitry may be adapted to TERC4 decode the received samples of data if the calculated distance value is zero (0). Circuitry may be adapted to calculate the distance value for each of the received samples of data by counting a number of bits having a value of one (1) in the output generated by the exclusive ORing of the received plurality of bits with the generated corresponding output samples of data. The system may further comprise circuitry that may be adapted to detect if the calculated distance value is non-zero. The detected calculated non-zero distance value may have a plurality of bits having a value of one (1). Circuitry may be adapted to choose any bit having a value of one (1) in the output generated by the exclusive ORing of the received plurality of bits with the generated corresponding output samples of data. Circuitry may be adapted to TERC4 decode the received samples of data in response to the choosing of any bit having a value of one (1). Circuitry may be adapted to choose a first bit having a value of one (1) in the output generated by the exclusive ORing of the received plurality of bits with the generated corresponding output samples of data. Circuitry may be adapted to TERC4 decode the received samples of data in response to the choosing of the first bit having a value of one (1). The detected calculated non-zero distance value may have a single bit having a value of one (1). Circuitry may be adapted to TERC4 decode the received samples of data in response to the detected non-zero distance value.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may provide a method and system for transition minimized differential signaling (TMDS) error reduction coding—4 bit (TERC4) decoding using minimum distance rule. A plurality of bits may be received that may indicate addresses of samples of data. A lookup table may be generated based on the received plurality of bits to determine corresponding output samples of data. The received plurality of bits may be exclusive ORed with the generated corresponding output samples of data. A distance value for each sample of data may be calculated based on an output generated by the exclusive ORing of the received plurality of bits with the generated corresponding output samples of data. An error in each of the received samples of data may be corrected based on the calculated distance value.

Figure 1:
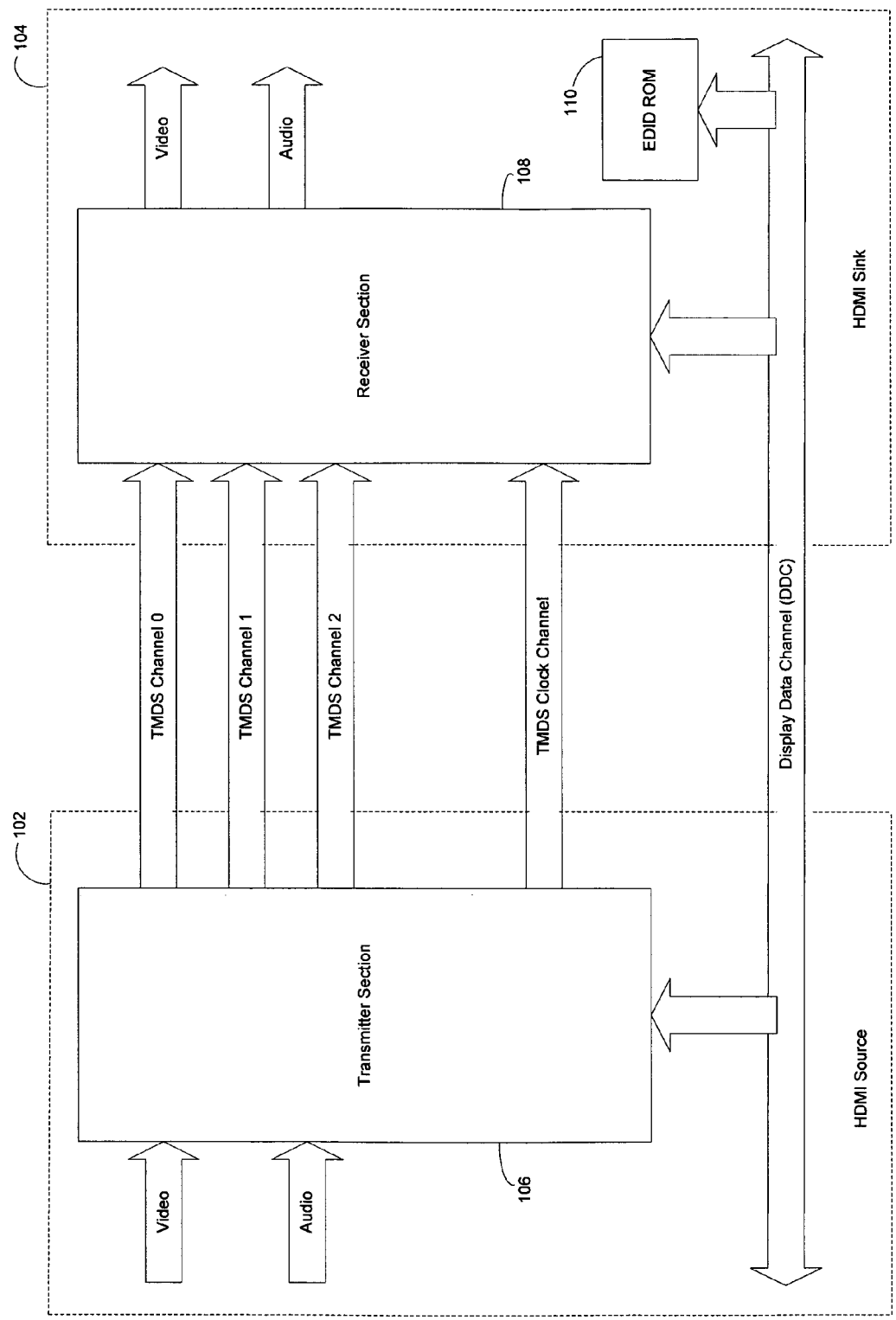
FIG. 1 is a block diagram of an exemplary system illustrating High Definition Multimedia Interface (HDMI) specifications that may be utilized in connection with an embodiment of the invention.

FIG. 1 is a block diagram of an exemplary system illustrating High Definition Multimedia Interface (HDMI) specifications that may be utilized in connection with an embodiment of the invention. Referring to FIG. 1, there is shown a HDMI source 102 and a HDMI sink 104. The HDMI source 102 may comprise a transmitter section 106 and the HDMI sink 104 may comprise a receiver section 108 and a ROM 110.

The transmitter section 106 may comprise suitable logic, circuitry and/or code that may be adapted to receive a plurality of input channels, for example, video, audio and auxiliary data from a display data channel (DDC) and generate a plurality of output TMDS data and clock channels. The receiver section 108 may comprise suitable logic, circuitry and/or code that may be adapted to receive a plurality of input TMDS data and clock channels, for example, TMDS channel 0, TMDS channel 1, TMDS channel 2 and a TMDS clock channel and auxiliary data from the DDC channel and may generate a plurality of output channels, for example, video and audio channels. The ROM 110 may comprise suitable logic, circuitry and/or code that may be adapted to store auxiliary data received from the DDC channel, for example, an extended display identification data (EDID) ROM.

The transmitter section 106 may transmit a plurality of TMDS data and clock channels to the receiver section 108. These channels may be used to carry video, audio and auxiliary data. In addition, HDMI may be adapted to carry a video electronics standards association (VESA) DDC channel. The DDC channel may be used for configuration and status exchange between a single source and a single sink. An optional consumer electronics control (CEC) protocol may provide high-level control functions between various audiovisual products in a user's environment.

Audio, video and auxiliary data may be transmitted across a plurality of TMDS data channels. A video pixel clock may be transmitted on the TMDS clock channel and may be used by a receiver as a frequency reference for data recovery on the plurality of TMDS data channels. Video data may be carried as a series of a plurality of pixels, for example, 24-bit pixels on the plurality of TMDS data channels. TMDS encoding may convert a plurality of bits, for example, 8 bits per channel into a 10 bit DC-balanced, transition minimized sequence which may then be transmitted serially at a rate of a plurality of bits per pixel clock period, for example, 10 bits per pixel clock period. Video pixel rates may range from 25 MHz, for example, to 165 MHz, for example. Video formats with rates below a certain frequency, for example, 25 MHz may be transmitted utilizing a pixel-repetition scheme. The video pixels may be encoded in RGB, YCBCR 4:4:4 or YCBCR 4:2:2 formats, for example, and may be transferred up to 24 bits per pixel, for example.

In order to transmit audio and auxiliary data across the TMDS channels, HDMI may utilize a packet structure. In order to attain a higher reliability of audio and control data, this data may be protected with a Bose, Chauduri and Hocquenghem (BCH) error correction code and may be encoded using a special error reduction coding scheme to produce a 10-bit word that may be transmitted.

Table 1 is an illustration of a generated lookup table that may be utilized in connection with an embodiment of the invention. Referring to Table 1, the first column of the table represents TERC4 encoded data. The second column represents the 4-bit TERC4 decoded data corresponding to each of the 10-bit TERC4 encoded samples of data. A lookup table may be generated based on the received plurality of bits to determine corresponding TERC4 decoded samples of data as illustrated in Table 1, for example.

| TERC4 encoded data | TERC4 decoded output |
| --- | --- |
| 10-1001-1100 | 0000 |
| 10-0110-0011 | 0001 |
| 00-1001-1100 | 0010 |
| . | . |
| . | . |
| . | . |
| 11-1001-1100 | 1101 |
| 01-0110-0011 | 1110 |
| 10-1100-0011 | 1111 |

Accordingly, when a signal containing symbol 10-1001-1100, for example, is received by a TMDS decoder, the TMDS decoder may be adapted to decode it to a 4 bit TERC4 decoded output 0000, for example.

Figure 2:
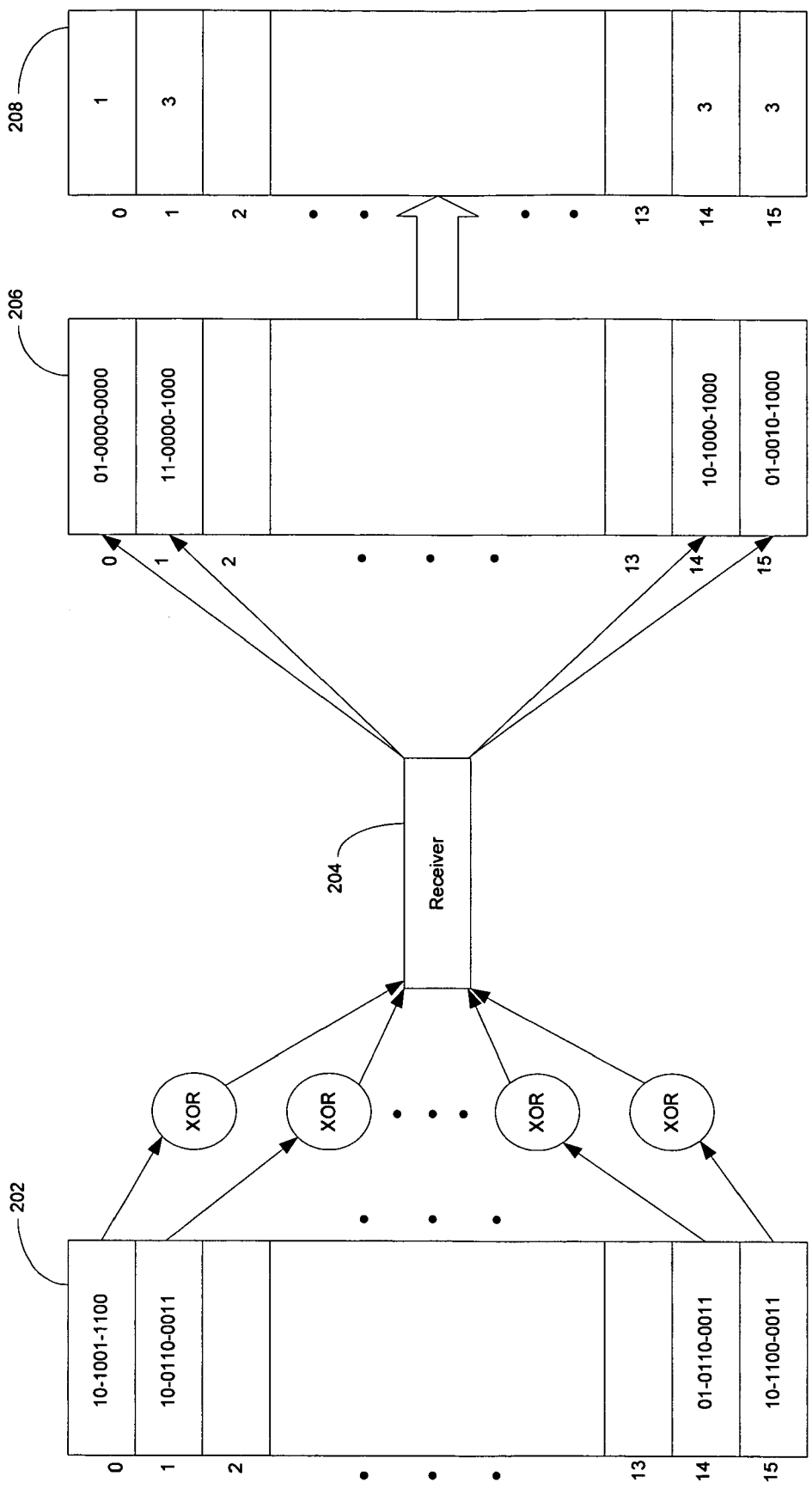
FIG. 2 is a block diagram illustrating exemplary steps to TERC4 decode an incoming sample of data using the minimum distance rule, in accordance with an embodiment of the invention.

FIG. 2 is a block diagram illustrating exemplary steps to TERC4 decode an incoming sample of data using the minimum distance rule, in accordance with an embodiment of the invention. Referring to FIG. 2, there is shown an output block 202, an input block 204, an output XOR block 206 and a distance value block 208. The output block 202 may be generated by a lookup table and may comprise a plurality of samples of data, for example, 16 samples of data corresponding to the received samples of data. Each sample of data may comprise a plurality of bits, for example, 10 bits as shown in FIG. 2. The input block 204 may comprise a plurality of received samples of data, for example, 16 samples of data. Each sample of data may comprise a plurality of bits, for example, 10 bits as shown in FIG. 2 indicating the address of the sample of data. The output XOR block 208 may comprise a plurality of samples of data, for example, 16 samples of data corresponding to the outputs generated by exclusive ORing each of the received samples of data with the corresponding output samples of data. The distance value block 208 may comprise a plurality of one bit samples of data, for example, 16 one bit samples of data corresponding to the outputs generated by the output XOR block 208.

In operation, a plurality of bits may be received by the receiver block 204 that may indicate addresses of samples of data. A lookup table may be generated based on the received plurality of bits to determine corresponding output samples of data that may be stored in the output block 202. The received plurality of bits stored in the receive block 204 may be exclusive ORed with the generated corresponding output samples of data stored in the output block 202. An output may be generated for each sample of data and stored in the output XOR block 206 by exclusive ORing each of the received plurality of bits stored in the receive block 204 with the generated corresponding output samples of data stored in the output block 202. A distance value for each of the received samples of data may be calculated and stored in the distance value block 208 by counting the number of bits having a value of one (1) in the output XOR block 206 for each sample of data generated by exclusive ORing the received plurality of bits stored in the receive block 204 with the generated corresponding output samples of data stored in the output block 202. An error in each of the received samples of data may be corrected based on the calculated distance value stored in the distance value block 208. The received samples of data may be TERC4 decoded to the nearest received sample of data in response to a detected non-zero distance value in accordance with the minimum distance rule and may correct up to a one (1) bit error. In an embodiment of the invention, a decode failure error may be generated when the calculated distance value is more than 1, for example, in accordance with an inherent limitation in TERC4 decoding.

Figure 3:
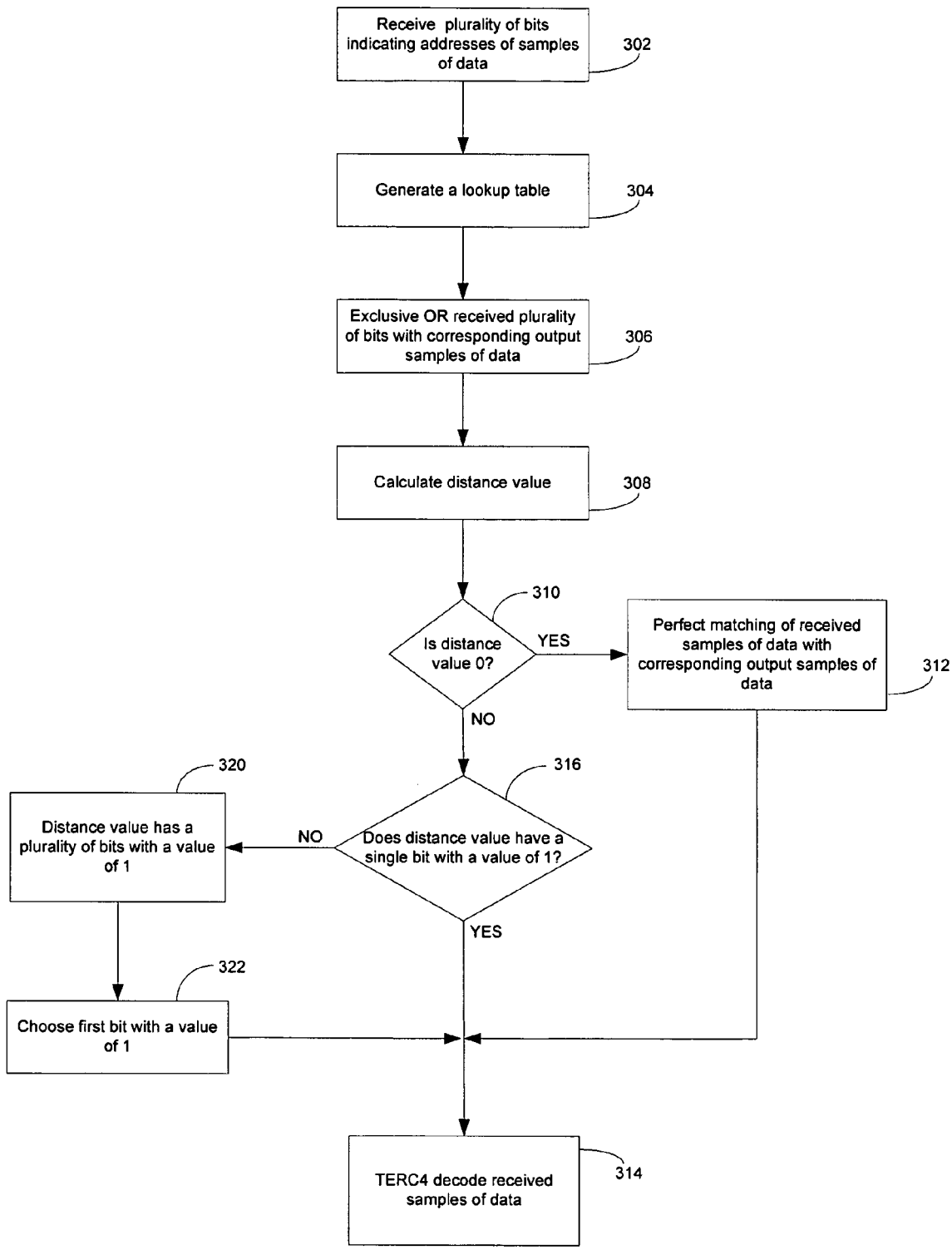
FIG. 3 is a flowchart illustrating exemplary steps for TERC4 decoding using the minimum distance rule, in accordance with an embodiment of the invention.

FIG. 3 is a flowchart illustrating exemplary steps for TERC4 decoding using the minimum distance rule, in accordance with an embodiment of the invention. Referring to FIG. 3, there is shown in step 302, a plurality of bits that may be received, which may indicate addresses of samples of data. In step 304, a lookup table may be generated based on the received plurality of bits to determine corresponding output samples of data. In step 306, the received plurality of bits may be exclusive ORed with the generated corresponding output samples of data. In step 308, a distance value for each sample of data may be calculated by counting the number of bits having a value of one (1) in the output generated by the exclusive ORing of the received plurality of bits with the generated corresponding output samples of data.

In step 310, the calculated distance value may be checked to determine if it is zero (0). If the calculated distance value is determined to be zero (0), step 312 indicates a perfect matching of the received samples of data with the corresponding output samples of data. In step 314, the received samples of data may be TERC4 decoded in accordance with the minimum distance rule. If the calculated distance value is not zero (0) in step 310, control passes to step 316, where it may be determined if the calculated non-zero distance value has a single bit having a value of one (1). If the calculated non-zero distance value has a single bit having a value of one (1), in step 314, the received samples of data may be TERC4 decoded in accordance with the minimum distance rule. If the calculated non-zero distance value does not have a single bit having a value of one (1), control passes to step 320 indicating that the calculated distance value has a plurality of bits having a value of one (1). In step 322, a first bit having a value of one (1) may be chosen in the output generated by the exclusive ORing of the received plurality of bits with the generated corresponding output samples of data. Control may return to step 314, where the received samples of data may be TERC4 decoded in accordance with the minimum distance rule.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for transition minimized differential signaling (TMDS) error reduction coding—4 bit (TERC4) decoding using minimum distance rule, the method comprising:
   receiving a plurality of bits indicating addresses of samples of data;
   generating a lookup table based on said received plurality of bits to determine corresponding output samples of data;
   exclusive ORing said received plurality of bits with said generated corresponding output samples of data;
   calculating a distance value for each said sample of data based on an output generated by said exclusive ORing of said received plurality of bits with said generated corresponding output samples of data; and
   correcting an error in each of said received samples of data based on said calculated distance value.

2. The method according to claim 1, further comprising detecting if said calculated distance value is zero (0).

3. The method according to claim 2, further comprising TERC4 decoding said received samples of data if said calculated distance value is zero (0).

4. The method according to claim 1, further comprising calculating said distance value for each of said received samples of data by counting a number of bits having a value of one (1) in said output generated by said exclusive ORing of said received plurality of bits with said generated corresponding output samples of data.

5. The method according to claim 4, further comprising detecting if said calculated distance value is non-zero.

6. The method according to claim 5, wherein said detected calculated non-zero distance value has a plurality of said bits having a value of one (1).

7. The method according to claim 6, further comprising choosing any bit having a value of one (1) in said output generated by said exclusive ORing of said received plurality of bits with said generated corresponding output samples of data.

8. The method according to claim 7, further comprising TERC4 decoding said received samples of data in response to said choosing of said any bit having a value of one (1).

9. The method according to claim 6, further comprising choosing a first bit having a value of one (1) in said output generated by said exclusive ORing of said received plurality of bits with said generated corresponding output samples of data.

10. The method according to claim 9, further comprising TERC4 decoding said received samples of data in response to said choosing of said first bit having a value of one (1).

11. The method according to claim 6, wherein said detected calculated non-zero distance value has a single bit having a value of one (1).

12. The method according to claim 11, further comprising TERC4 decoding said received samples of data in response to said detected non-zero distance value.

13. A machine-readable storage having stored thereon, a computer program having at least one code section for transition minimized differential signaling (TMDS) error reduction coding—4 bit (TERC4) decoding using minimum distance rule, the at least one code section being executable by a machine for causing the machine to perform steps comprising:
   receiving a plurality of bits indicating addresses of samples of data;
   generating a lookup table based on said received plurality of bits to determine corresponding output samples of data;
   exclusive ORing said received plurality of bits with said generated corresponding output samples of data;
   calculating a distance value for each said sample of data based on an output generated by said exclusive ORing of said received plurality of bits with said generated corresponding output samples of data; and correcting an error in each of said received samples of data based on said calculated distance value.

14. The machine-readable storage according to claim 13, further comprising code for detecting if said calculated distance value is zero (0).

15. The machine-readable storage according to claim 14, further comprising code for TERC4 decoding said received samples of data if said calculated distance value is zero (0).

16. The machine-readable storage according to claim 13, further comprising code for calculating said distance value for each of said received samples of data by counting a number of bits having a value of one (1) in said output generated by said exclusive ORing of said received plurality of bits with said generated corresponding output samples of data.

17. The machine-readable storage according to claim 16, further comprising code for detecting if said calculated distance value is non-zero.

18. The machine-readable storage according to claim 17, wherein said detected calculated non-zero distance value has a plurality of said bits having a value of one (1).

19. The machine-readable storage according to claim 18, further comprising code for choosing any bit having a value of one (1) in said output generated by said exclusive ORing of said received plurality of bits with said generated corresponding output samples of data.

20. The machine-readable storage according to claim 19, further comprising code for TERC4 decoding said received samples of data in response to said choosing of said any bit having a value of one (1).

21. The machine-readable storage according to claim 18, further comprising code for choosing a first bit having a value of one (1) in said output generated by said exclusive ORing of said received plurality of bits with said generated corresponding output samples of data.

22. The machine-readable storage according to claim 21, further comprising code for TERC4 decoding said received samples of data in response to said choosing of said first bit having a value of one (1).

23. The machine-readable storage according to claim 18, wherein said detected calculated non-zero distance value has a single bit having a value of one (1).

24. The machine-readable storage according to claim 23, further comprising code for TERC4 decoding said received samples of data in response to said detected non-zero distance value.

25. A system for transition minimized differential signaling (TMDS) error reduction coding—4 bit (TERC4) decoding using minimum distance rule, the system comprising:
  circuitry that receives a plurality of bits indicating addresses of samples of data;
  circuitry that generates a lookup table based on said received plurality of bits to determine corresponding output samples of data;
  circuitry that exclusive ORs said received plurality of bits with said generated corresponding output samples of data;
  circuitry that calculates a distance value for each said sample of data based on an output generated by said exclusive ORing of said received plurality of bits with said generated corresponding output samples of data; and
  circuitry that corrects an error in each of said received samples of data based on said calculated distance value.

26. The system according to claim 25, further comprising circuitry that detects if said calculated distance value is zero (0).

27. The system according to claim 26, further comprising circuitry that TERC4 decodes said received samples of data if said calculated distance value is zero (0).

28. The system according to claim 25, further comprising circuitry that calculates said distance value for each of said received samples of data by counting a number of bits having a value of one (1) in said output generated by exclusive ORing of said received plurality of bits with said generated corresponding output samples of data.

29. The system according to claim 28, further comprising circuitry that detects if said calculated distance value is non-zero.

30. The system according to claim 29, wherein said detected calculated non-zero distance value has a plurality of said bits having a value of one (1).

31. The system according to claim 30, further comprising circuitry that chooses any bit having a value of one (1) in said output generated by said exclusive ORing of said received plurality of bits with said generated corresponding output samples of data.

32. The system according to claim 31, further comprising circuitry that TERC4 decodes said received samples of data in response to said choosing of said any bit having a value of one (1).

33. The system according to claim 30, further comprising circuitry that chooses a first bit having a value of one (1) in said output generated by said exclusive ORing of said received plurality of bits with said generated corresponding output samples of data.

34. The system according to claim 33, further comprising circuitry that TERC4 decodes said received samples of data in response to said choosing of said first bit having a value of one (1).

35. The system according to claim 30, wherein said detected calculated non-zero distance value has a single bit having a value of one (1).

36. The system according to claim 35, further comprising circuitry that TERC4 decodes said received samples of data in response to said detected non-zero distance value.

* * * * *